(12) United States Patent
Chang et al.

(10) Patent No.: US 6,506,661 B1
(45) Date of Patent: Jan. 14, 2003

(54) ISOLATION METHOD TO REPLACE STI FOR DEEP SUB-MICRON VLSI PROCESS INCLUDING EPITAXIAL SILICON

(75) Inventors: Chai-Der Chang, Hsin-Chu (TW); Pin-Hsiang Chin, Hsin-Chu (TW)

(73) Assignee: Taiwan Semiconductor Manufacturing Company, Hsin-chu (TW)

( * ) Notice: Subject to any disclaimer, the term of this patent is extended or adjusted under 35 U.S.C. 154(b) by 0 days.

(21) Appl. No.: 09/541,482

(22) Filed: Apr. 3, 2000

(51) Int. Cl.⁷ .......................... H01L 21/76; H01L 21/20; H01L 21/36
(52) U.S. Cl. .......................... 438/413; 438/429; 438/481
(58) Field of Search ................................. 438/413, 429, 438/481

(56) References Cited

U.S. PATENT DOCUMENTS

| | | | |
|---|---|---|---|
| 4,891,092 A | * | 1/1990 | Jastrzebski |
| 4,910,165 A | * | 3/1990 | Lee et al. |
| 5,296,086 A | * | 3/1994 | Takasu |
| 5,686,343 A | * | 11/1997 | Lee |
| 5,926,721 A | * | 7/1999 | Hong et al. |

* cited by examiner

Primary Examiner—John F. Niebling
Assistant Examiner—Ron Pompey
(74) Attorney, Agent, or Firm—George O. Saile; Stephen B. Ackerman

(57) ABSTRACT

In accordance with the objectives of the invention a new method is provided for the definition and delineation of active regions in the surface of a semiconductor substrate. A layer of pad oxide is grown on the surface of the substrate, the layer of pad oxide is patterned and etched whereby the pad oxide remains in place over areas where the isolation regions are to be created. The underlying silicon substrate is in this manner exposed; the regions of the silicon substrate that are exposed are the regions of the substrate where active devices are to be created. The exposed surface of the substrate is cleaned; the openings in the layer of pad oxide are selectively filled with a deposition of epitaxial silicon. The created structure is heat treated to improve the interface between the patterned and etched layer of pad oxide and the deposited epitaxial silicon. The created pattern of pad oxide can now be used as regions of field isolation over the surface of the substrate.

7 Claims, 1 Drawing Sheet

ISOLATION METHOD TO REPLACE STI FOR DEEP SUB-MICRON VLSI PROCESS INCLUDING EPITAXIAL SILICON

BACKGROUND OF THE INVENTION (1) Field of the Invention

The invention relates to the fabrication of integrated circuit devices, and more particularly, to a method of electrically isolating active regions on the surface of a semiconductor substrate thereby replacing the use of Shallow Trench Isolation regions.

(2) Description of the Prior Art

Semiconductor devices that are created on the surface of a substrate are electrically isolated from each other using techniques that are well established and that have been used extensively in the art. Three of the best-known techniques used for this purpose are Localized Oxidation of Silicon (LOCOS), poly buffered LOCOS and the use of Shallow Trench Isolation (STI) regions.

Current semiconductor progress depends to a large extent on a continued effort of micro-miniaturization of devices and device features that results in improved device performance and increased device density. This continued shrinkage of device dimensions presents new problems of device design and manufacturing. One of these problems is the requirement to provide an efficient and reliable process for the separation of active devices for the current miniaturized scale. One method previously used is the LOCOS process. The LOCOS process depends on the use of a temporary patterned nitride layer, this layer of nitride is used as a protective or resistant layer that covers the future active areas during the subsequent field oxidation process for forming CMOS gate structures. The industry provides numerous examples of efficient application of the LOCOS process with alternate approaches to achieve device isolation such as the Selective Polysilicon Oxidation (SEPOX) method.

The processing sequence for creating LOCOS isolation regions is as follows: an oxidation layer, generally silicon nitride, is deposited over a pad oxide overlying a silicon substrate. The pad oxide is a thin thermal oxide, which allows better adhesion between the nitride and the silicon substrate and acts as a stress relaxation layer during field oxidation. The nitride and oxide layers are etched to leave openings exposing portions of the silicon substrate where the local oxidation will take place thereby differentiating these regions from the regions in the surface of the substrate into which the active devices are to be formed. A boron channel-stop layer is ion implanted into the isolation regions. The field oxide is grown within the openings by placing the substrate in an oxidation environment, generally in steam at a high temperature such as 1100 degrees C. The portions of the silicon substrate not covered by the oxidation barrier oxidize to form thermal silicon in these portions while oxidation is masked from the active regions by the oxidation barrier. The nitride and pad oxide layers are removed completing the local oxidation of the silicon substrate. LOCOS field oxide is generally formed to a sufficient thickness such that a conductor placed over the LOCOS field oxide will not convert the underlying channel when biased to the maximum circuit voltage. The LOCOS process however suffers from the occurrence of the so-called bird's beak. Adequate cushioning between the silicon nitride and the silicon substrate requires the presence of a layer of pad oxide of considerable thickness. This however brings with it that the layer of nitride becomes less effective as an oxidation mask thereby allowing lateral oxidation to occur in the surface of the substrate. This lateral oxidation is referred to at the bird's beak effect and is detrimental to the requirements of sub-miniaturization since the bird's beak reaches under and into regions that are being defined as active device regions, thereby limiting the smaller dimensions that can be assigned to these regions.

The disadvantages of LOCOS can be summarized as follows:

the bird's beak structure encroaches into the device active area the pre-implanted channel stop dopant re-distributes during the high temperature that is associated with field oxide growth. Redistribution of channel stop dopant primarily affects the active area periphery causing problems known as narrow-width defects the thickness of field oxide causes large elevational disparities across the semiconductor topography between field and active regions. Topographical disparities cause planarity problems which become severe as circuit critical dimension shrink thermal oxide growth is significantly thinner in small field regions (that is field regions of small lateral dimensions) relative to large field regions.

An alternate approach to defining active regions in the surface of a substrate is the use of Shallow Trench Isolation (STI) regions. STI regions can be made using a variety of methods. For instance, one method is to use Buried Oxide (BOX) isolation combined with shallow trenches. The method involves creating trenches in the surface of the substrate that delineate the active regions in the surface of the substrate and filling the trenches with a chemical vapor deposition (CVD) of silicon oxide ($SiO_2$). The $SiO_2$ is etched back or Chemically Mechanically Polished (CMP) yielding a planar surface of the STI regions. The shallow trenches etched for the BOX process are anisotropically plasma etched into the silicon substrate and are typically between 0.5 and 0.8 micrometer (pm) deep. STI regions are typically formed around active device regions to a depth between 4,000 and 20,000 Angstrom.

Another approach in forming STI's is to deposit silicon nitride on thermally grown oxide. After deposition of the nitride, a shallow trench is etched into the substrate using a mask. A layer of oxide is then deposited into the trench so that the trench forms an area of dielectric insulation, which acts to isolate the devices in a chip and thus reduces cross talk and leakage currents between active devices. The excess deposited oxide is removed and the trench planarized to prepare for the next level of metallization. The silicon nitride is provided to the silicon to prevent polishing of the masked silicon oxide of the device.

Disadvantages of the application of STI regions can be summarized as follows:

forming of STI's involves etching in silicon, which creates dangling bonds at the surface of the created trenches. It is believed that dangling bonds and an irregular grain structure form in the silicon substrate near the wells of the trench. Such dangling bonds may promote trapping of charge carriers within the active areas of an operating transistor. As a result, charge carrier mobility may be hindered, and the output current of the transistor may decrease to an amount at which optimum device performance is unattainable during subsequent anneal processing (e.g. thermal oxidation for gate oxide formation), the irregular grain may provide migration avenues through which oxygen atoms can pass from the field oxide to the active area near the edges of field oxide. Oxygen atoms that are present in active areas of the silicon may function as electron donors. Thus, inversion of silicon may occur in subsequently formed p-type active areas near the walls of the isolation trench. Further, the edge of a device may not conduct as much current as the interior portion of the device. Therefore, more charge to the gate of a transistor may be required to invert the channel than if no inversion occurred, causing threshold voltage, Vt, to shift undesirably from its design specifications.

In a subsequent processing steps, the semiconductor topography may undergo a high temperature anneal to activate impurity species in the active areas and to annihilate crystalline defect damage to the substrate. Unfortunately, impurity species, such as boron, in the active area may undergo diffusion into the isolation region when subjected to high temperatures. As a result, the threshold voltage in the isolation regions may decrease. Thus, migration of impurities into the isolation region may lead to current inadvertently flowing between active areas, defeating the purpose of having the trench isolation in the first place. It is therefore desirable to develop a technique for forming a trench isolation structure between active regions in which problems related to dangling bonds and irregular grain structure in the active area are alleviated. Such a technique is required to inhibit charge carriers and oxygen donors from being entrapped in the active areas. Yet further, it is desirable that impurity species be prevented from migrating into the trench isolation structure so that current leakage between active areas may be inhibited the required silicon nitride and silicon substrate etch are difficult processing steps, and the trench oxide deposition is an expensive High Density Plasma (HDP) step.

U.S. Pat. No. 4,412,868 (Brown et al.) shows a method comprising: (1) form isolation oxide on substrate (2) etch AA openings (3) deposit Si in AA openings. This patent has an additional $O_2$ I/I step, but appears to show all the steps of the invention. This may raise an obvious rejection by the PTO.

U.S. Pat. No. 4,929,566 (Beitman) shows a process including (1), (2) and (3).

U.S. Pat. No. 5,443,992 (Risch et al.) shows a process for epitaxily growing a Si in opening in an isolation layer. This is close.

U.S. Pat. No. 5,234,861 (Roisen at al.) teaches a process of growing Si in a trench of isolation oxide.

U.S. Pat. No. 4,592,792 (Coroy Jr. et al.) teaches a process to (1) form isolation ox on substrate (2) etch AA openings (3) deposit Si in AA openings.

SUMMARY OF THE INVENTION

A principle objective of the invention is to provide a method for defining active regions in the surface of a substrate that is simple and readily integratable into a high speed, high volume semiconductor manufacturing environment.

Another objective of the invention is to provide a method for defining active regions in the surface of a substrate that can be used for the creation of semiconductor devices in the era of sub-micron and deep sub-micron device features.

In accordance with the objectives of the invention a new method is provided for the definition and delineation of active regions in the surface of a semiconductor substrate. A layer of pad oxide is grown on the surface of the substrate, the layer of pad oxide is patterned and etched whereby the pad oxide remains in place over areas where the isolation regions are to be created. The underlying silicon substrate is in this manner exposed; the regions of the silicon substrate that are exposed are the regions of the substrate where active devices are to be created. The exposed surface of the substrate is cleaned; the openings in the layer of pad oxide are selectively filled with a deposition of epitaxial silicon. The created structure is heat treated to improve the interface between the patterned and etched layer of pad oxide and the deposited epitaxial silicon. The created pattern of pad oxide can now be used as regions of field isolation over the surface of the substrate.

BRIEF DESCRIPTION OF THE DRAWINGS

FIG. 4 shows a cross section after removing the layer of pad oxide from the surface of the substrate.

FIGS. 5a and 5b shows additional steps of forming a dielectric isolation layer over exposed surfaces, followed by removing the dielectric isolation layer from the bottom of the openings separating the patterned and etched layer of epitaxial silicon. These additional steps are performed after (FIG. 4) removing the layer of pad oxide from a surface of the substrate.

DESCRIPTION OF THE PREFERRED EMBODIMENTS

Figure 1:
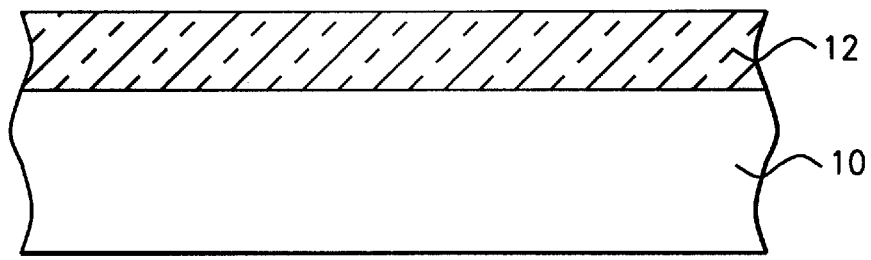
FIG. 1 shows a cross section of a silicon substrate over which a layer of pad oxide has been grown.

Referring now specifically to FIG. 1, there is shown a cross section of a silicon substrate 10 over which a layer 12 of pad oxide has been grown.

The layer 12 of pad oxide can be formed by thermal oxidation of the underlying silicon at a temperature of about 920 degrees C. for a time period of about 480 minutes to a thickness of between about 1000 and 4000 Angstrom. Layer 12 of pad oxide can also be formed in conjunction with a deposited oxide layer, nitride layer or any other material suitable for use as a gate dielectric. Pad oxide is usually formed as a silicon dioxide material but may be a composite oxide, such as TEOS and silicon dioxide, or a nitride oxide layer or a like gate dielectric.

Figure 2:
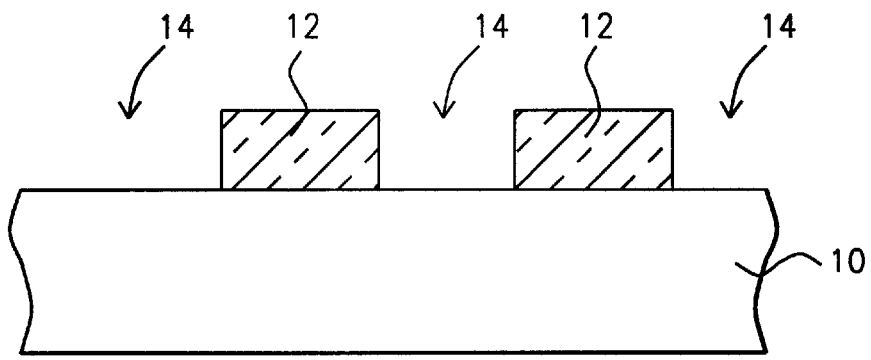
FIG. 2 shows a cross section of the silicon substrate after the layer of pad oxide has been patterned and etched.

FIG. 2 shows a cross section of the silicon substrate 10 after the layer 12 of pad oxide has been patterned and etched creating openings 14 in the layer 12 of pad oxide. Openings 14 expose and align with the surface areas of the underlying silicon substrate 10 where regions of electrical isolation have to be formed, as a corollary of this can be said that the surface regions of the underlying substrate 10 that remain covered by the patterned layer 12 of pad oxide are the active surface regions of substrate 10.

Layer 12 of pad oxide can be etched by applying for instance reactive ion etching using $Ar/CF_4$ as an etchant at a temperature of between about 120 and 160 degrees C. and a pressure of between about 0.30 and 0.40 Torr for a time of between about 33 and 39 seconds using a dry etch process. Pad oxide layer 12 can also be etched using BEO, the BOE may comprise a mixed solution of fluoroammonium and fluorohydrogen (7:1) and phosphoric acid solution.

Care must be exercised when performing the etch of the layer 12 that the surface of the substrate that is exposed as the bottom of openings 14 is not damaged. The can be accomplished by performing an etch that has high selectivity of oxide versus silicon, thereby removing the pad oxide but nor effecting the underlying silicon (the bottom of openings 14).

Figure 3:
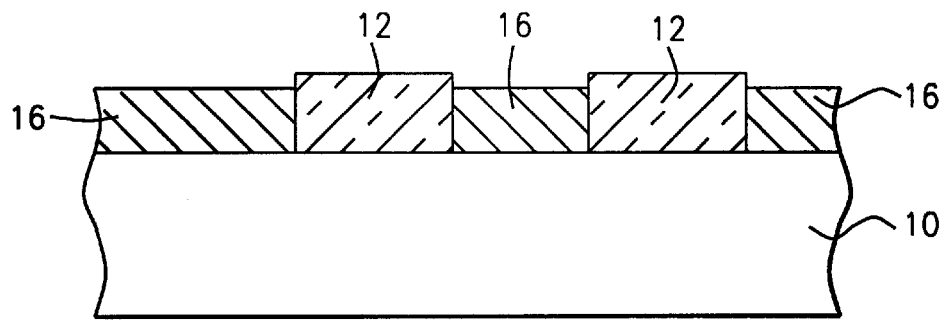
FIG. 3 shows a cross of the silicon substrate after a layer of epitaxial silicon has been selectively deposited and heat-treated.

FIG. 3 shows a cross of the silicon substrate 10 after a layer 16 of epitaxial silicon has been selectively deposited within the openings 14 that have been created in the layer 12 of pad oxide. It must be noted that the top surface of layer 16 is below the top surface of layer 12 by a thickness of about 500 Angstrom.

Prior to the deposition of layer 16 of epitaxial silicon the exposed surface of the substrate is thoroughly cleaned.

Techniques and procedures for meticulously cleaning of silicon wafers during VLSI fabrication are well known in the art and are critical for obtaining high yields and suitable performance characteristics of semiconductor devices. Removal of impurities from the wafer surface is important because impurities may diffuse into the semiconductor substrate during subsequent high-temperature processing thereby altering the substrate bulk and surface properties. Some impurities are donor or acceptor dopants, which directly affect device performance characteristics. Other impurities cause surface or bulk defects such as traps, stacking faults or dislocations. The various types of impurities and contaminants must be removed by careful cleaning, such as chemical or ultrasonic cleaning. The cleaning process can begin with a cleaning step involving wafer scrubbing to remove loose particulate contaminants. Subsequent to the water scrubbing process, treatment with organic solvents, such as trichloroethylene, acetone, p-xylene, methanol and ethanol, can be performed to remove organic impurities. A final cleaning includes treatment with several various inorganic chemicals. These inorganic chemical mixtures are strong oxidants, which form a thin oxide layer at the wafer surface. This oxide layer is stripped, removing impurities absorbed into the oxide layer. Chemical cleaning for removing chemically bonded film from wafer surface is one in a cleaning process. Conventional chemical cleaning includes a series of acid and rinse baths.

Epitaxial silicon is silicon that, as is well known in the art, has its crystal orientation controlled by the crystal substrate whereby the crystal orientation of the deposited epitaxial film is determined by the crystal orientation of the underlying silicon substrate. Layer 16 of epitaxial silicon must be free of crystallographic defects causing no stress in the layer 16.

After the selective deposition of the epitaxial silicon layer 16, the substrate is subjected to a heat treatment that unifies the crystal structure on the boundary between the silicon substrate 10 and the patterned and etched layer 12 of pad oxide.

This heat treatment is a three phased exposure, as follows:
the first phase is an exposure to a temperature in excess of 1000 degrees C. for a time between about 30 minutes and 1 hour in an ambient environment of pressure. During this phase, stress that exists along the interface between the surface of the underlying silicon substrate and the overlying layer of epitaxial silicon is released while the sharp demarcation of the interface between these tow layers is removed the second phase is a rapid decrease in the temperature from 1000 degrees C. to between about 900 and 950 degrees C., the time for this decrease in temperature is between 10 and 20 minutes the temperature is then held steady at between about 900 and 950 degrees C. for a time of between about 10 and 30 minutes; during this time interval of steady temperature of less than 950 degrees C., a thin layer of wet oxide is formed on the sidewalls of the created openings and the EPI to silicon interface whereby the wet oxide converts to a thin layer of SAC oxide after which the temperature is raised, over a time period of between about 10 and 20 minutes, to in excess of 1000 degrees C. where the temperature is held at this level for between about 30 minutes and 1 hour. During this phase of the temperature exposure, the SAC oxide is annealed forming a thin layer of high resistivity molecular structure that is particularly suited to prevent leakage currents between the regions of electrical insulation (the STI regions) and the surrounding areas.

After the substrate has been exposed to the indicated temperature cycle, the heat treatment of the surface of the substrate is considered complete and the substrate is allowed to return to environmental conditions of temperature and pressure. The results of the temperature treatment that has been indicated is to improve the interface between the epitaxial silicon and the pad oxide while at the same time a thin layer of SAC oxide is grown on the surface of the deposited epitaxial silicon.

After the indicated heat treatment has been completed, the layers of pad oxide 12 can now be used as regions of field isolation over the surface of the substrate while active devices are created over the surface of the layers of epitaxial silicon, using the thin layer of oxide grown over the surface of the epitaxial silicon as a pad oxide for thereover created gate electrodes.

Although the invention has been described and illustrated with reference to specific illustrative embodiments thereof, it is not intended that the invention be limited to those illustrative embodiments. Those skilled in the art will recognize that variations and modifications can be made without departing from the spirit of the invention. It is therefore intended to include within the invention all such variations and modifications which fall within the scope of the appended claims and equivalents thereof.

What is claimed is:

1. A method of forming regions of electrical isolation on the surface of a silicon substrate, comprising the steps of:
providing a substrate of silicon semiconductor material;
growing a layer of pad oxide over a surface of said substrate;
patterning and etching said layer of pad oxide thereby creating openings in said layer of pad oxide thereby furthermore exposing a surface of said substrate;
surface cleaning said exposed surface of said substrate;
selectively depositing a layer of epitaxial silicon over a surface of said substrate whereby said epitaxial silicon essentially fills said openings; and
thermally treating said layer of deposited epitaxial silicon.

2. The method of claim 1 wherein said growing a layer of pad oxide over a surface of said substrate is a process of thermal oxidation of the underlying silicon at a temperature of about 920 degrees C. for a time period of about 480 minutes to a thickness of between about 1000 and 4000 Angstrom.

3. The method of claim 1 wherein said growing a layer of pad oxide over a surface of said substrate is forming a layer of pad oxide in conjunction with a deposited oxide layer, nitride layer or any other material suitable for use as a gate dielectric.

4. The method of claim 1 wherein said growing a layer of pad oxide over a surface of said substrate is forming a layer of silicon dioxide or a composite oxide or a nitride oxide layer.

5. The method of claim 1 wherein said patterning and etching said layer of pad oxide is applying reactive ion etching using Ar/CF$_4$ as an etchant at a temperature of between about 120 and 160 degrees C. and a pressure of between about 0.30 and 0.40 Torr for a time of between about 33 and 39 seconds using a dry etch process.

6. The method of claim 1 wherein said patterning and etching said layer of pad oxide is using BEO as an etchant gas whereby said BOE comprises a mixed solution of fluoroammonium and fluorohydrogen (7:1) and phosphoric acid solution.

7. A method of forming regions of electrical isolation on the surface of a silicon substrate, comprising the steps of:

providing a substrate of silicon semiconductor material;

growing a layer of pad oxide over a surface of said substrate to a thickness between about 1000 and 4000 Angstrom;

patterning and etching said layer of pad oxide thereby creating openings in said layer of pad oxide thereby furthermore exposing a surface of said substrate;

surface cleaning said exposed surface of said substrate;

selectively depositing a layer of epitaxial silicon over a surface of said substrate whereby said epitaxial silicon essentially fills said openings to a thickness between about 500 and 3500 Angstrom; and thermally treating said layer of deposited epitaxial silicon by exposing said substrate in an ambient environment of pressure to a temperature in excess of 1000 degrees C. for a time between about 30 minutes and 1 hour followed by a rapid decrease over a time period between about 10 and 20 minutes in the temperature from in excess of 1000 degrees C. to between about 900 and 950 degrees C. after which the temperature is held constant at between about 900 and 950 degrees C. for a time of between about 10 and 30 minutes after which the temperature is raised over a time period of between about 10 and 20 minutes to in excess of 1000 degrees C. where the temperature is held at this level for between about 30 minutes to 1 hour.

* * * * *